United States Patent

[15] 3,643,293

Rejsa et al.

[45] Feb. 22, 1972

[54] POULTRY TRANSFER APPARATUS AND METHOD

[72] Inventors: Jack J. Rejsa, Minneapolis, Minn.; Paul K. Kiker, Ellijay, Ga.

[73] Assignee: The Pillsbury Company, Minneapolis, Minn.

[22] Filed: Oct. 13, 1970

[21] Appl. No.: 81,831

[52] U.S. Cl. .................................................17/11, 198/179
[51] Int. Cl. ..........................................................A22b 3/08
[58] Field of Search .................198/20, 177, 179, 131; 17/11

[56] References Cited

UNITED STATES PATENTS 3,548,448  12/1970  Vertegaal ..................................17/11

Primary Examiner—Edward A. Sroka
Attorney—Ronald E. Lund and James V. Harmon

[57] ABSTRACT

Poultry transported by a first conveyor is hung by the feet from shackles. As the birds are moved horizontally at a constant speed by the first conveyor, they are engaged by transfer shackles of a special construction which are supported from a second conveyor. The transfer shackles include a clamp for each thigh composed of a slot and a retaining lug. When the thighs of each bird are forced into the slots, the retainer lug snaps into place over the open end of the slot to prevent the thigh from being released. The birds are then carried by the transfer shackles to a third conveyor which is also provided with leg shackles. The legs of the bird are brought into registry with the shackles of the third conveyor and a cam assembly engaging the transfer shackle releases the retaining lugs and allows the thighs of the bird to fall from the transfer shackles.

8 Claims, 7 Drawing Figures

INVENTOR.
JACK J. REJSA
PAUL K. KIKER
BY
ATTORNEY

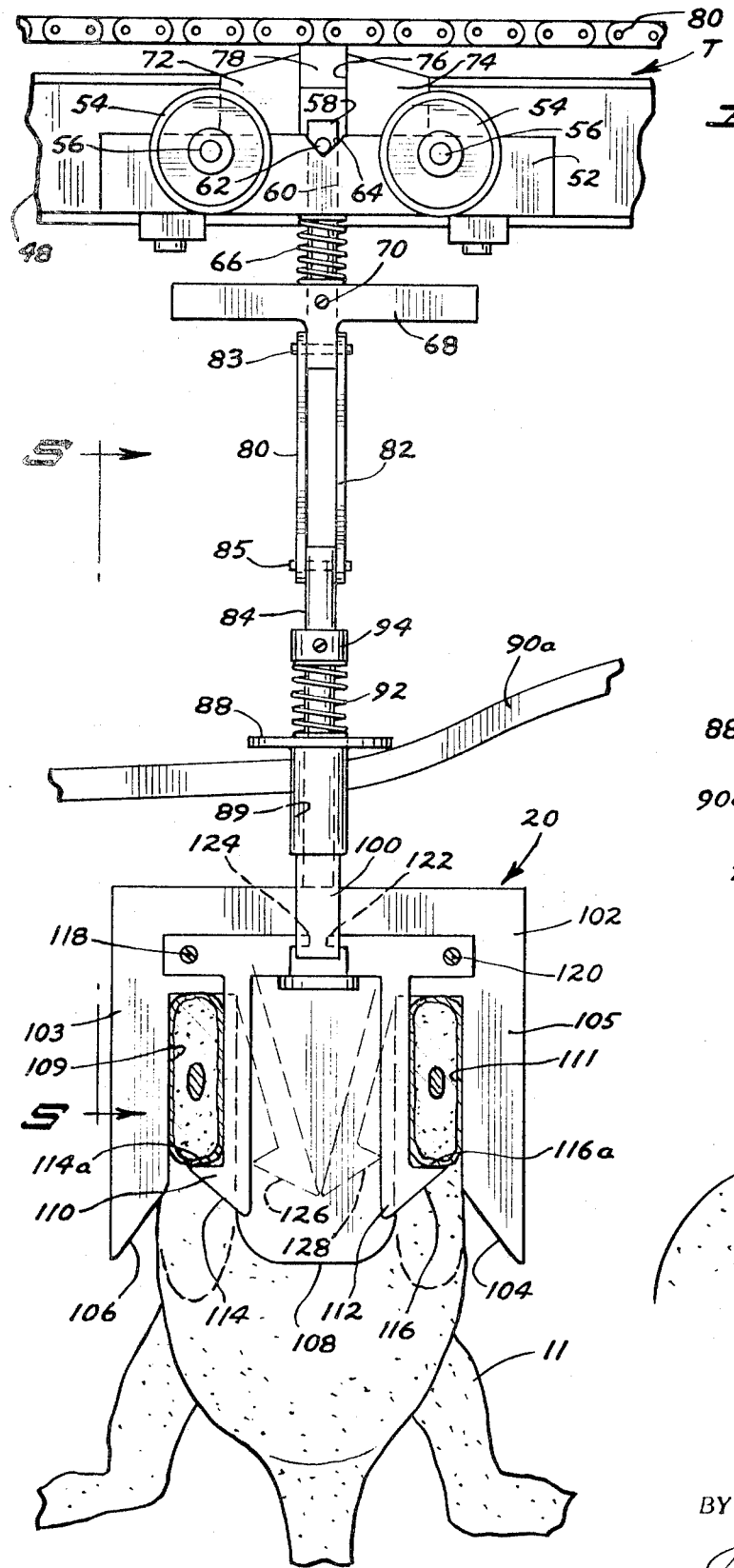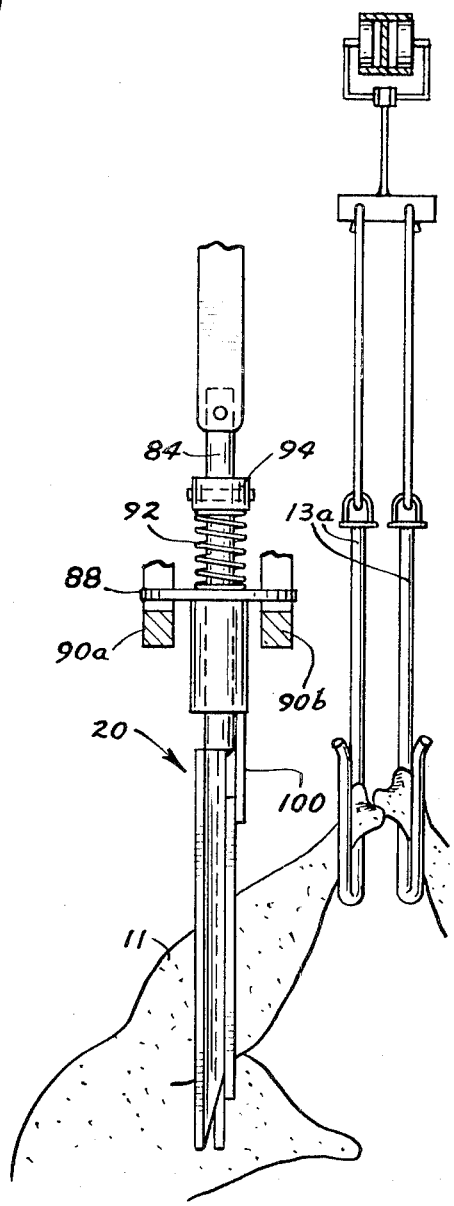

PATENTED FEB 22 1972

INVENTOR.
JACK J. REJSA
PAUL K. KIKER
BY James V. Harmon
ATTORNEY

INVENTOR.
JACK J. REJSA
PAUL K. KIKER
BY James V. Hornoy
ATTORNEY

POULTRY TRANSFER APPARATUS AND METHOD

The present invention relates to poultry equipment and more particularly to a method and apparatus for transferring poultry from one conveyor to another and for orienting the birds with respect to one another.

In commercial plants in which poultry is processed on a high volume basis, conveyors are employed for transferring the poultry from one operation to the next. When as in most plants, separate conveyors are employed for the picking and eviscerating lines, it is necessary to transfer the birds from the picking line conveyor to the eviscerating line conveyor. This was previously done manually. Thus, in a typical plant operation, birds were removed manually from shackles provided on the picking line conveyor. In other plants, the birds are cut down by means of an automatic hock cutting machine which engages the legs of the bird and severs the legs at the hock joint. The birds then fall onto a conveyor belt, are moved to the evisceration line, and are hung manually on the shackles of the evisceration conveyor. Typically the evisceration line travels at a much slower speed than the picking conveyor and frequently the birds are positioned in laterally aligned pairs on 6 inch longitudinally spaced centers with the breasts facing inwardly. These previous systems have been slow and sometimes resulted in a large accumulation of birds between the conveyors. In addition the rough operation has been expensive, unpleasant, and requires a substantial amount of manpower.

In view of these and other deficiencies of the prior art, the invention has among its objects the following features and advantages; (a) the ability to quickly and efficiently transfer poultry from one conveyor to another without requirement of hand labor; (b) a provision for engaging and transferring poultry from one conveyor to another without damaging the meat; (c) a provision for picking up birds that are traveling at a relatively rapid rate; e.g., 50 ft. a minute and transferring them to a conveyor that is traveling at a much slower rate for example 25 ft. per minute; (d) a provision for transferring poultry in two parallel rows and for orienting the poultry such that the breasts face inwardly; (e) a provision for coordinating the speed of a transfer conveyor with an evisceration and a picking conveyor; (f) a provision for accurately placing the transfer conveyor shackles in a position adapted to engage the legs of the birds on the picking conveyor; and (g) a provision for feeding the transfer conveyor shackles to the picking line only when the birds are present on the line.

These and other more detailed and specific objects will be apparent in view of the following specifications and drawings wherein:

FIG. 1a is a partial vertical section through a segment of the transfer conveyor and one shackle carriage.

FIG. 4 is a side elevational view taken on line 4—4 of FIG. 1 and

FIG. 5 is a partial end elevational view taken on line 5—5 of FIG. 4.

Briefly, the present invention provides a transferring system for removing poultry from one conveyor and transferring it to a second conveyor. The invention also provides a transfer shackle for this purpose and an assembly for turning the shackle through 180° to orientate the birds with respect to a vertical axis so that they are facing in the proper direction. A means is provided for feeding the transfer shackles into the position in which they will engage a bird only when a bird is present on the picking line. A further provision is made for pressing each bird into engagement with a transfer shackle.

In a preferred embodiment of the invention, birds being conveyed by a first conveyor are supported therefrom by shackles which engage the feet of the poultry. As the birds progress at a constant speed, they are engaged by transfer shackles of a special construction which are supported upon a second conveyor. The transfer shackles include clamps adapted to engage each thigh. Birds are forced into the clamps which include open ended slots. Upon becoming engaged in the slots in the transfer shackles, a spring-loaded retainer lug snaps into place over the open end of the slot to prevent the thigh from being released. The birds are then carried by the transfer shackles to a third conveyor which is also provided with leg shackles. The legs of the bird are then brought into registry with the shackles of the third conveyor and a cam assembly engaging the transfer shackle releases the retaining lugs allowing the legs of the bird to be removed from the transfer shackles.

In the accomplishment of the foregoing and related ends, the invention then comprises the features hereinafter fully described and particularly pointed out in the claims, the following description setting forth in detail certain illustrative embodiments of the invention, these being indicative, however, of but a few of the various ways in which the principles of the invention may be employed.

Figure 1:
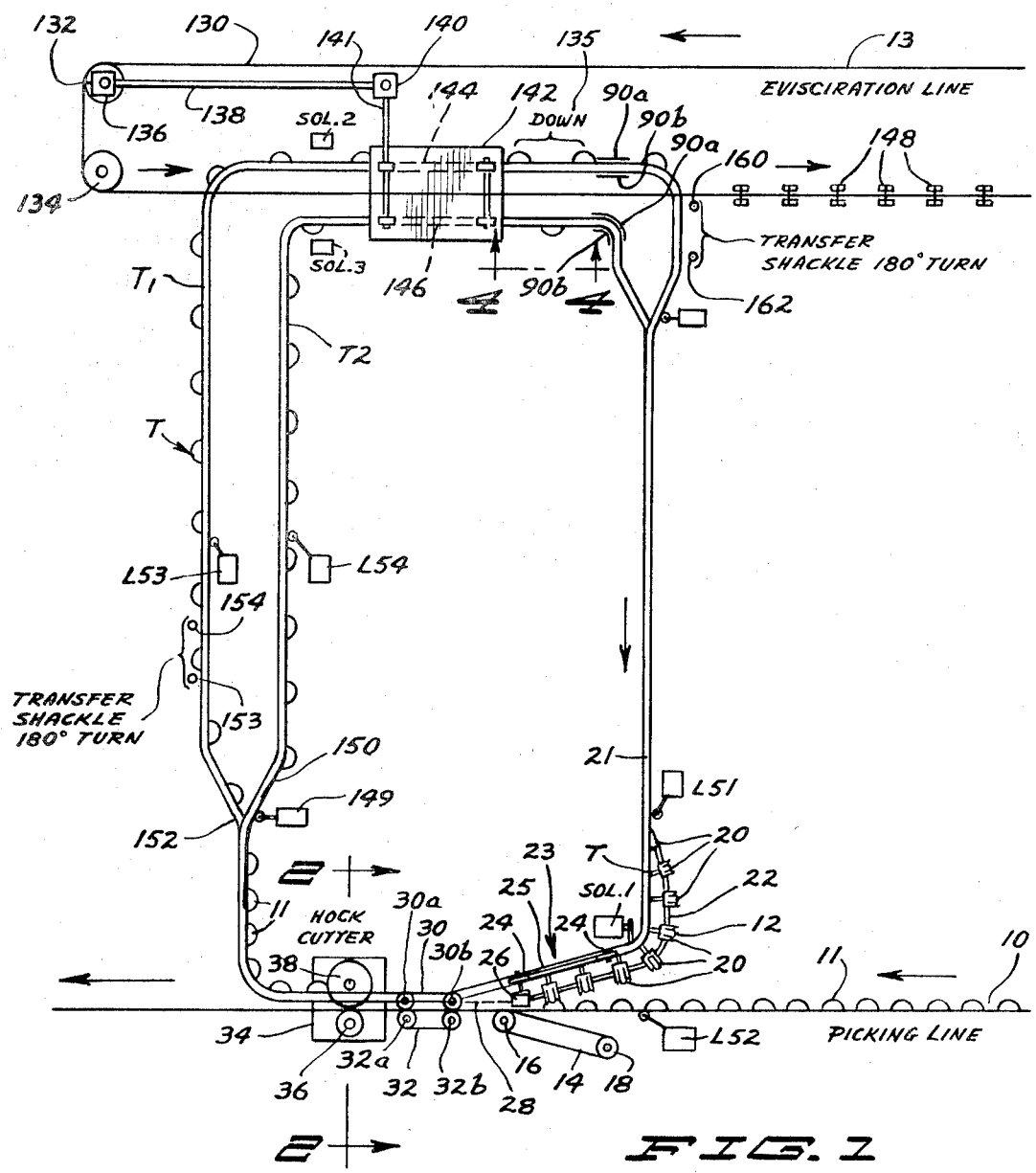
FIG. 1 is a schematic showing of the poultry conveyor system.
Figure 2A:
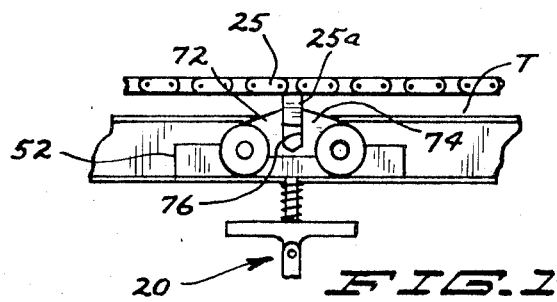
FIG. 2 is a view taken on line 2—2 of FIG. 1 on a greatly enlarged scale.
Figure 2:
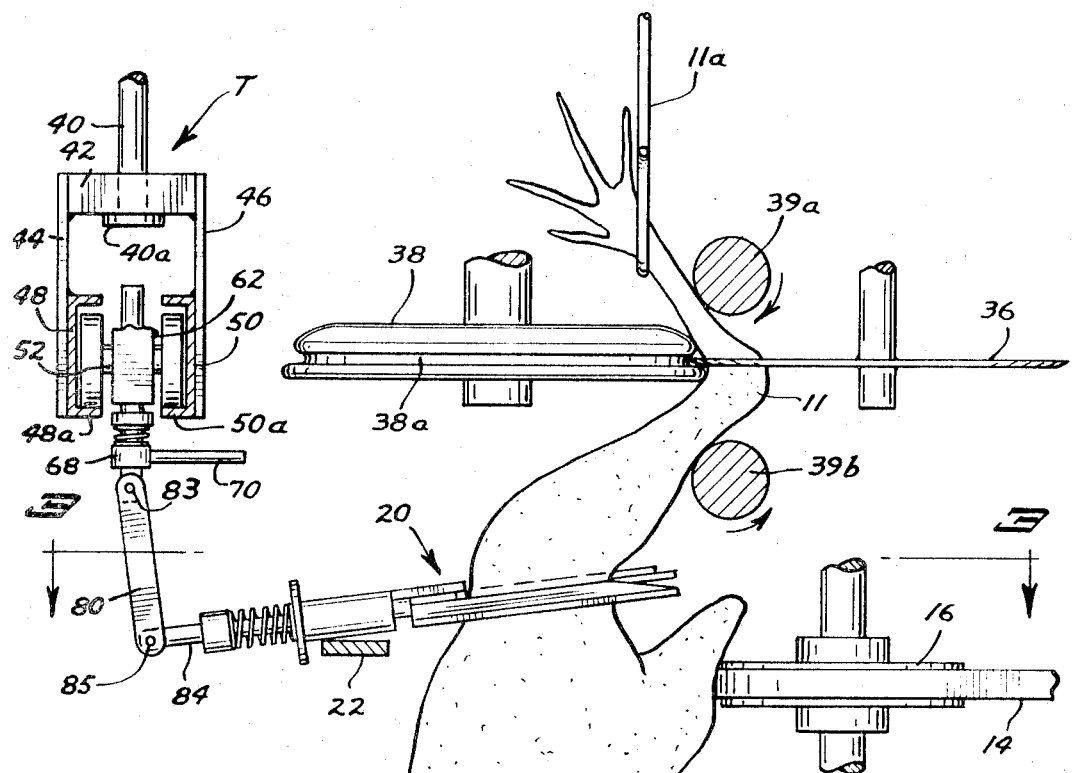

Referring now to FIG. 1 there is shown a picking line conveyor indicated generally by the numeral 10. On the picking line conveyor 10 are a plurality of longitudinally spaced-apart shackles 11a (FIG. 2). Typically the picking line conveyor travels at the rate of 100 birds per minute with the birds being spaced longitudinally on 6 inch centers. This means the conveyor travels at the rate of about 50 feet per minute. The object of the invention is to transfer the birds from the picking line 10 to an evisceration line conveyor 13 in which the birds travel at the rate of 100 birds per minute on 6 inch centers and in laterally aligned pairs. Thus, the evisceration line 13 travels at the rate of about 25 feet per minute. It can therefore be seen that if both lines are running at the rate of 100 birds per minute, if the evisceration line abruptly slows to 80 birds per minute, for example, as required for cleaning or inspection the excess of 20 birds per minute will accumulate within a transfer conveyor T in accordance with the invention. Provision is made for accumulating the birds within the transfer conveyor including a gravity storage arrangement which will gravity feed the birds and provide storage as described below.

As seen in FIG. 1, each bird 11 on picking line 10 in turn strikes limit switch L52 which is suitably wired to a solenoid 1 provided with a stop 12. The stop 12 is operatively associated with transfer conveyor T so as to engage and retain in position a plurality of transfer shackles 20 until such time as the solenoid 1 is energized by the contact of one of the birds 11 with the limit switch L52. Thus, as seen in FIG. 1, the transfer shackles 20 feed by gravity from a position roughly indicated at 21. By inclining the section of the conveyor T downwardly, the conveyor shackles 20 are stored in this manner upstream of the solenoid 1 until the limit switch L52 is actuated at which time the retaining lug 12 is retracted and shackles 20 are allowed one at a time to transfer from beyond the solenoid 1 from right to left as seen in the figures.

Figure 3:
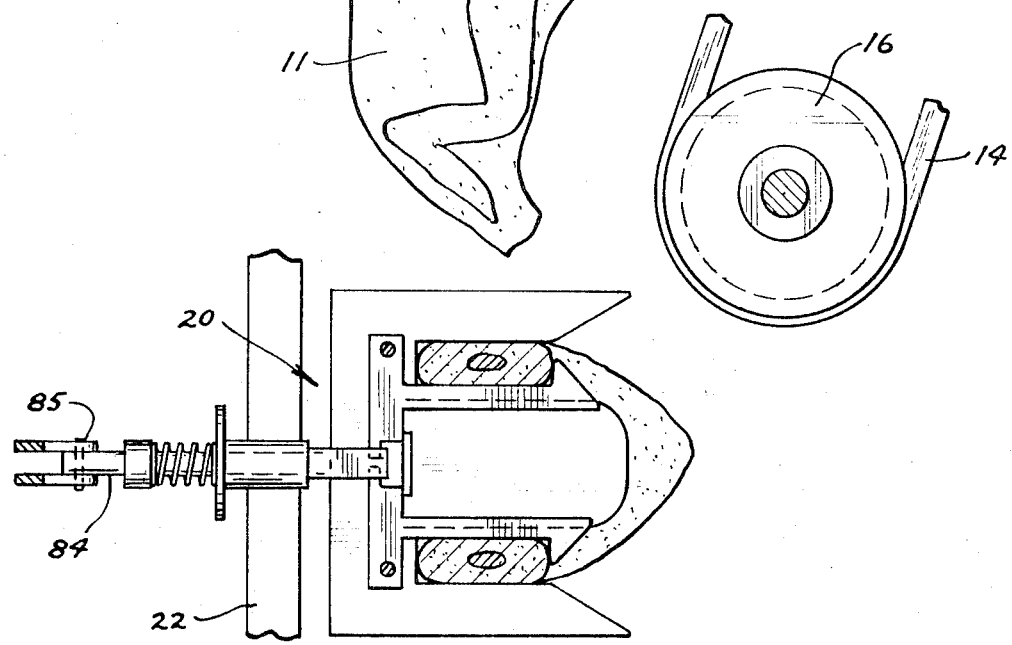
FIG. 3 is a horizontal sectional view taken on line 3—3 of FIG. 2.

Positioned adjacent to the transfer conveyor T downstream from the point 21 located laterally therefrom is a shackle elevating rail 22 a portion of which can also be seen in FIG. 2 and 3. The rail 22 as seen in FIG. 1 is initially relatively close to the transfer conveyor T and proceeding downwardly as seen in FIG. 1 it is located further and further from the conveyor T and is at the same time elevated further from the floor proceeding toward the left in the figure downward. In this way the rail engages the surfaces of the transfer conveyor shackles 20 and elevates them from the normal vertical free-hanging position to a laterally disposed position as shown in FIG. 2 and 3 in the area between the solenoid 1 and L52. As the transfer conveyor T swings toward the left as seen in FIG. 1 the shackle supporting rail 22 also bends to the left and extends parallel thereto with it. In this manner, the transfer shackles 20 are at all times maintained in a horizontal position and are located at a precisely controlled elevation which corresponds with the position of the lower ends of the legs of the birds 11 on the picking conveyor 10 as shown in FIG. 2.

The position and location of the now horizontally oriented transfer shackles 20 is controlled by an endless timing chain conveyor 23 (FIGS. 1 and 1a) which is composed of sprockets 24 over which is entrained a timing chain 25 provided with spaced lugs 25a one of which engages each successive transfer shackle 20. As seen in FIG. 1a, the lugs 25a project vertically from the timing chain 25 into a vertically disposed upwardly opening recess 76 defined by vertically disposed bars 72 and 74 which from a portion of the carriage 52 supporting the transfer shackle 20 on the rail of the overhead conveyor T. In this way each one of the transfer shackles 20 is positioned in lateral alignment with one of the birds 11 on the picking line.

The conveyor 23 is coupled to the picking line by the provision of a gearbox 26 connected to a sprocket 25 and driven in turn by a shaft 28 that is coupled to caterpillar drive chains 30 and 32 which are entrained respectively over sprockets 30a–30 and 32a–32b. As seen in FIG. 1, the center section of the caterpillar chains 30 and 32 engage the picking line conveyor chain 10 and is therefore driven by it at the same speed and in the same direction, thereby providing power to shaft 28, transmission 26 and sprocket 24 to the timing chain 25.

It can be seen from the above description that as the transfer shackles 20 proceed toward the picking line conveyor they will be in an approximately horizontal position and will be traveling in the same speed and direction as the birds 11. They will also be positioned in a lateral alignment with the birds and their lower or free ends will be in alignment with the joints between the legs and the body.

As shown in FIG. 1, 2, and 3, there is positioned on the opposite side of the picking line from the transfer shackles 20, a bird positioning belt 14 comprising an endless belt entrained over a pair of horizontally spaced-apart idler pulleys 16 and 18 located appropriately so that the downstream end of the belt assembly 14 is closer to the birds than the upstream end. In this way the birds are engaged by the belt 14 and are forced toward the left. As the birds travel toward the viewer as seen in FIG. 2 they are forced into the transfer shackle 20. The transfer shackles themselves are held against movement toward the right by the track of the overhead transfer conveyor T. It will be seen that at this point the birds are supported both by the shackles 11a of the picking line conveyor 10 and the transfer shackles 20.

Figure 6:
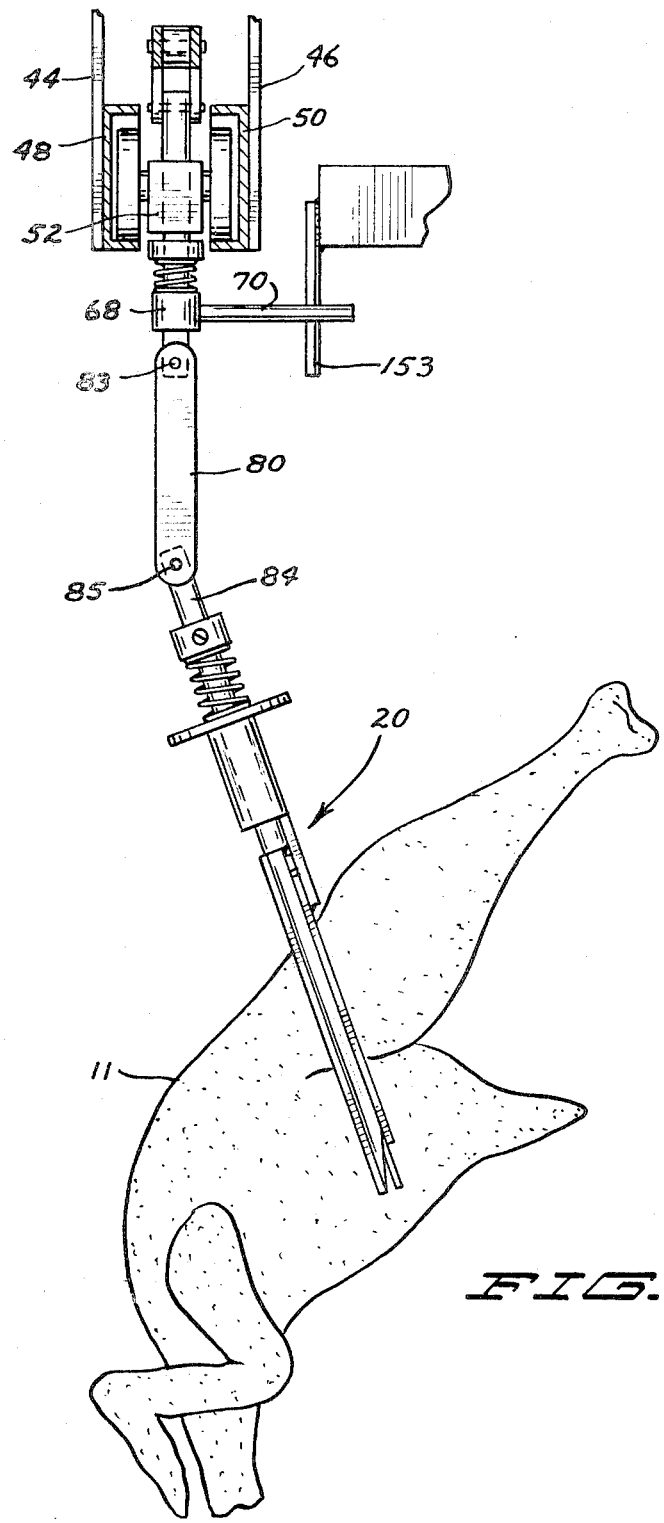
FIG. 6 is an enlarged showing of the poultry shackle conveyor.

While the birds are supported both by conveyors 11 and transfer conveyor T, they enter the hock cutter 34 which can be of any suitable commercially available unit such as the equipment known as the Hock Cutter manufactured by the Gainesville Machine Company of Gainesville, Georgia. This unit includes a pair of cooperating wheels 36 and 38 the former of which is sharpened on its edge to serve as a cutter which acts against a wheel 38 having a circumferentially extending horizontally disposed groove 38a in which a segment of the blade 36 is engaged. Both of the wheels 36 and 38 are supported for rotation on vertical axles a pair of rolls 39a and 39b engage the legs just before the legs pass between wheels 36 and 38 to help position the hock joint to be severed by the blade 36. As soon as the hock joint is cut, the birds fall to the approximate position of FIG. 6. The birds are then supported solely by the transfer shackle 20.

The transfer conveyor T comprises a rail supported from a series of vertically disposed hanger rods 40 (FIG. 2) having heads 40a supporting crossbars 42. Extending longitudinally of the crossbars and projecting downwardly therefrom are laterally spaced support plates 44 and 46 to which channels 48 and 50 are secured rigidly as by welding. Between the channels 48 and 50 are located the carriers 52 which can be formed from an elongated piece of metal provided with suitably bored longitudinally spaced openings providing support for wheels 54 and axles 56 (FIG. 4). The wheels in turn are engaged upon the lower webs 48a and 50a respectively of the channels 48 and 50. The carrier 52 has a centrally disposed vertically positioned supporting rod that extends downwardly through a bore 16 in carrier 52 of the appropriate size to provide a smooth sliding fit for the rod 58.

As seen in FIG. 2 and 4 a rod 58 is provided with a laterally extending pin 62 engaged in a V-shaped notch 64 in the upper surface of the carrier 52. A compression spring 66 is connected between the carrier 52 and a crossbar 68 secured rigidly as by welding to the shaft 58. An orienting pin 70 extends laterally from the crossbar 68 for rotating the transfer shackle 20 about its vertical axis as will be described below. The lower end of the crossbar 68 is secured to a pair of downwardly extending parallel links 80 and 82 connected to the crossbar 68 by a pivot pin 83. Fastened to the lower end of the links 80 and 82 by pin 85 is a support rod 84. A collar 94 which is releasably secured to the rod 84 engages the upper end of the compression spring 92. The lower end of spring 92 is engaged upon a cam follower plate 88 which is bored at 89 so slide longitudinally upon the rod 84. Fixed to the lower end of the follower 88 is a latch 100 that moves as seen in FIG. 4 when the cam follower 88 is forced upwardly against the pressure spring 92 by engagement of the cam rails 90a and 90b.

The portion of the transfer shackle 20 engaging the thighs of the bird comprises a plate 102 having parallel spaced-apart legs 103 and 105. The ends of the legs 103–105 are beveled at 104–106 to facilitate insertion of the chicken thighs. Positioned between legs 103 and 105 is a tongue 108 defining open ended slots 109 and 111. The latch members 110 and 112 are provided with beveled ends which are inclined in the appropriate direction to facilitate insertion of the thighs. The latch members also have retaining lugs 114a, 116a which hold the thighs in place. The latches are pivotally connected to the shackle by pivots 118 and 120 and are able to move when the follower 110 is raised by the connection between the follower 110 and tabs 122 and 125 to the dotted line positions 126 and 128 in FIG. 4 when the follower 88 is engaged by rails 90a and 90b thereby releasing the thighs from the shackles.

As described briefly above when the legs of the chicken are carried by the transfer conveyor T into proximity with the evisceration conveyor 13 they are brought into engagement with the shackles 13a thereof before the cam members 90a and 90b cause the latches 110 and 112 to release.

The passage of the birds from the transfer conveyor T to the evisceration line 13 will now be described.

As shown in FIG. 1, the evisceration line conveyor travels toward the transfer conveyor initially from right to left as seen in the figure, thence over wheel 132, wheel 134 and from left to right between parallel horizontally disposed laterally spaced sections T1 and T2 of the transfer conveyor T composed of identical rails T as described herein above. The transfer conveyor section T1 and T2 are positioned at a slighter lower elevation than the conveyor evisceration line 13 at the left in the figure. However, in the section designated 135 the lines 13 and 15 are inclined downwardly proceeding from left to right thereby causing the hock joints to slide downwardly to the hooks and to the shackles 13a as shown in FIG. 5. As soon as this has been done, the shackles are opened by engagement of the cam follower 88 with the cam rails 90a and 90b.

The drive system for coordinating the transfer of birds from the transfer conveyor T to the evisceration line 13 comprises a gearbox 136 connected to wheel 132 which is coupled by means of the drive shaft 138 right-angle gearbox 140, shaft 141 to a tractor drive 142 comprising a pair of laterally spaced drive chains 144 and 146 each from the shaft 141 and positioned in vertical alignment with the portions T1 and T2 of the conveyor T. The chains 144 and 146 are provided with lugs (not shown) identical to the lugs 25a of chain 25 which engage the recess 76 of the carriages 52 in the same manner and thereby locate the transfer shackles in lateral alignment with the shackles 13a of the evisceration line conveyor 13.

Locating the birds in laterally aligned pairs on conveyor 13 is accomplished by the division of the transfer conveyor T into two parts T1 T2. Separation of the birds 11 into the sections T1 and T2 is accomplished by a cylinder 149 (FIG. 1) which is connected to swing a segment 150 to the left or right about pivot 52 so that its free end is in alignment with either of track sections T1 and T2 so that each consecutive bird is fed alternately to track sections T1 and T2. As can be seen in FIG. 1, the breasts of the birds 11 after leaving the hock cutter all face toward the right. The shackles in section T1 are pivoted through 180° about a vertical axis by stationary lug 153 which strikes the pin 70 and a lug 154 which strikes the crossbar 68 thereby driving the retaining pin 62 out of the notch 64 as the shackle is turned through 180°. The breasts of the birds then face outward away from the evisceration line conveyor 13.

As the shackles 20 travel the descending portion of the conveyor 135, the free ends of the legs (the hocks) will slide into the shackles 13a and it is just after this has been completed that the follower 88 engages the cam tracks 90a and 90b. The cams then elevate the follower 88 and thereby elevate tabs 122 and 124. The retaining lugs are then moved to the retracted positions 126 and 128. The birds then fall out of the shackles 20 and are supported solely by the shackles of the conveyor 13.

The control system for advancing the birds on conveyor T will now be described. Normally, the carriages supporting the transfer shackle 20 are carried by gravity into the timing chain 25. L52 is normally closed. If L52 is opened by the passage of a bird then current is not supplied to the solenoid 1 whereupon the solenoid lever 12 rises and allows a carriage and shackle to feed into the timing chain 25. L51 allows a carriage and shackle to feed into the timing chain 25. L51 senses whether or not there are transfer shackles present in storage. If there are not, the picking line conveyor 10 is halted through suitable electrical connections to the drive of the picking line conveyor 10 (not shown).

The limit switches L53 and L54 are wired to solenoids 2 and 3 respectively and are normally closed switches. If a bird contacts a switch it opens, in which case the solenoids 2 or 3 as the case may be is actuated whereupon the solenoid armature drops down into the conveyor racks halting the forward movement of the carriages therein thereby preventing them from entering the timing chains of the tractor drive 142. In this way, the feed to the tractor drive 142 is stopped when no birds are present in sections T1 and T2. The empty transfer shackles in section T1 are rotated back to their original position by stationary posts 160 and 162.

We claim:

1. A method fro transferring poultry from a first conveyor to a second conveyor comprising; providing a transfer shackle including a gripping means for engaging and retaining a portion of the body of the bird, bringing the transfer shackle into proximity with a bird supported upon the first conveyor, engaging the bird upon the transfer shackle, disengaging the bird from the first conveyor whereby it is supported solely by the transfer shackle conveyor, locating the birds on the transfer shackle with respect to the shackles on the second conveyor, engaging portions of the birds with shackles of the second conveyor and disengaging and removing the transfer shackle from the bird.

2. The method of claim 1 wherein the transfer shackle is placed in proximity with the joint between a leg and the body and is engaged thereupon.

3. The method of claim 1 wherein the transfer shackle is provided with a member having an open-ended recess and a leg of the bird is engaged therewith by forcing the leg into the open ended recess in the shackle.

4. A transfer apparatus for carrying poultry from a first conveyor to a second conveyor comprising; an endless transfer conveyor, a plurality of transfer shackles on the transfer conveyor, clamp means on the transfer shackles for engaging and retaining portions of the body of the bird, said transfer conveyor having a means for advancing the shackles therealong, means for locating the transfer shackle with respect to birds on the first conveyor, means for placing the transfer shackle into engagement with the birds, means for releasing the birds from the first conveyor, means for engaging parts of the birds on the transfer conveyor with the second conveyor, and means operative upon the transfer shackles for disengaging the birds therefrom when engaged by the second conveyor.

5. The apparatus of claim 4 wherein the transfer shackles are freely and independently movable back and forth on the transfer conveyor and a timing means including an endless timing number having lugs thereon adapted to engage the shackles is operative connected to the first conveyor for locating the transfer shackles with respect to the birds located on the first conveyor whereby the transfer shackles are positioned in alignment with the birds on the first conveyor.

6. The apparatus according to claim 4 wherein a sensing means is operatively associated with the first conveyor for sensing whether or not birds are present thereon and a movable stop member positioned for movement toward and away from the shackles on the transfer conveyor is connected to the sensing means in the sense such that the stop will be moved to a position obstructing the forward movement of the transfer shackle when the sensing means is not actuated by the presence of a bird on the first conveyor.

7. The apparatus of claim 4 wherein the transfer shackles comprise supporting means extending downwardly from the transfer conveyor and a shackle member at the lower end thereof having at least one open-ended slot therein to receive a portion of the body of the bird and a retaining lug means operatively associated with the open end of the slot to close the open end of the slot after the said body portion has been forced into the slot and a means operatively associated with the lug for moving the lug to an out-of-the-way releasing position when the bird is to be withdrawn from the shackle.

8. The apparatus of claim 4 wherein the transfer conveyor is divided into two similar parallel laterally spaced sections positioned in part on opposite sides of the second conveyor and means is provided on the transfer conveyor for orienting the birds thereon such that the birds on both sides of the second conveyor face the second conveyor.

* * * * *